Feb. 28, 1961     Z. F. GRAHAM     2,972,819
DEVOTIONAL PRAYER COUNTING DEVICE
Filed June 29, 1959
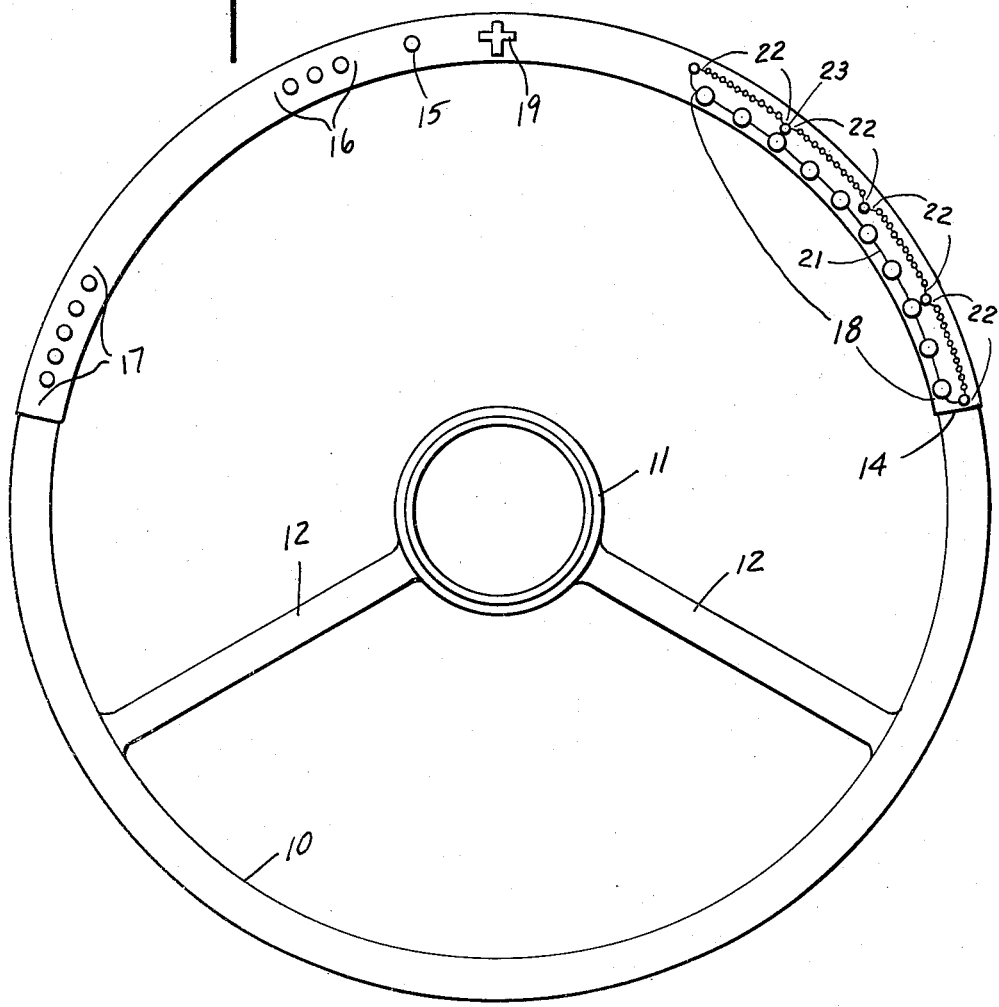
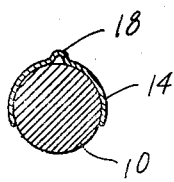
INVENTOR.
ZIBA F. GRAHAM.

United States Patent Office 2,972,819
Patented Feb. 28, 1961

2,972,819

DEVOTIONAL PRAYER COUNTING DEVICE

Ziba F. Graham, Washington, Ind., assignor to St. Simon's Church, Washington, Ind., Most Reverend Henry J. Grimmelsman, Bishop of the Roman Catholic Diocese, Evansville, Ind.

Filed June 29, 1959, Ser. No. 823,531

2 Claims. (Cl. 35—23)

This invention relates generally to a devotional prayer counting device and, more particularly, to a device adapted to be attached to the steering wheel of an automobile so that the driver thereof may say prayers while driving the automobile.

It is customary among people of the Catholic faith to count the prayers of the rosary by means of a string of beads. While driving an automobile it would not be feasible for a person to use a string of beads for counting prayers. Consequently, it would be highly desirable to arrange means on the steering wheel so that a person could say his prayers without removing his hands from the steering wheel.

The principal object of this invention is to provide a prayer counting device which may be attached to the steering wheel of an automobile.

In accordance with this invention there is provided a prayer counting device in the form of an adhesive tape member having embossments therein grouped in a manner to permit the driver of an automobile to count the prayers of the rosary.

The full nature of the invention will be understood from the accompanying drawings and the following description and claims:

Fig. 1 is a top plan view illustrating the device of this invention as it is applied to the steering wheel of an automobile.

Fig. 2 is a cross section taken on line 2—2 of Fig. 1.

Referring to the drawings, Fig. 1 illustrates a steering wheel 10 of an automobile having conventional construction wherein a rim is attached to a hub member 11 by means of spokes 12. According to this invention there is provided a tape-like member 14 which may be formed of cloth having a layer of adhesive on one side thereof, or it may be formed of plastic materials such as those commonly referred to by the trade name, cellophane, or other well known plastic materials having a layer of adhesive on one side thereof. The tape should be of sufficient thickness to be embossed as indicated at 15, 16, 17 and 18 to provide groups of embossments on the outer side of the tape. The tape is also embossed at 19 to resemble the form of a cross.

As a condition for gaining certain indulgences, the tape is provided with a small endless wire string or chain 21 connecting the embossments within the group 18, and the member 21 may be attached to the tape on its lower side so that four decades 22 of very small beads may be strung thereon thereby to provide a total of five decades which corresponds to the true rosary. Each decade is separated from adjacent decades by a single bead such, for example, as 23. Each of the embossments in group or decade 18 may be of different colors and the same is true of the embossments in the group 17.

Tape 14 may be applied to steering wheel 10 with the adhesive coating in contact therewith so that the embossments project outwardly of the steering wheel surface. When the driver of the automobile wishes to say his rosary he may place a finger of one hand on the cross and recite the Apostles Creed. Thereafter, by using one finger of each hand, he may feel the embossments 15, 16 and 17 with one finger while feeling the embossments 18 with the finger of his other hand. By transferring his fingers from one embossment to another as he says each prayer it is possible for him to count the prayers of the rosary while gripping the steering wheel and driving the automobile. If the person is interrupted when saying his prayers by traffic conditions or other reasons he may recall the color of the bead on which his finger may be resting when the interruption occurs. When the person so desires, he may continue his prayers without being required to recommence the entire series of prayers.

From the foregoing description it will be apparent that this invention provides a prayer counting device which may be attached to the steering wheel of an automobile and which is so arranged that a person may gain certain indulgences even though he is not counting prayers on the conventional string of beads.

The invention claimed is:

1. A prayer counting device for attachment to an automobile steering wheel comprising a strip of flexible material attachable to said steering wheel and having a portion overlying the right hand and a portion overlying the left hand peripheries of said wheel, said strip having protrusions extending outwardly thereof, one of said portions having a group of protrusions representing a certain group of rosary prayers and the other said portion of said tape having at least one group of protrusions for counting prayers said in said other group of protrusions.

2. The device of claim 1 additionally comprising an endless filament connecting the protrusions of said first mentioned group and extending between said strip of material and said steering wheel, said filament having four decades of beads strung thereon whereby with said first mentioned group, five decades in a continuous chain are provided.

References Cited in the file of this patent

UNITED STATES PATENTS

| | | |
|---|---|---|
| D. 183,209 | Fast | July 15, 1958 |
| D. 184,365 | Marker | Feb. 3, 1959 |
| 2,078,059 | Churchill | Apr. 20, 1937 |
| 2,351,918 | Brennan | June 20, 1944 |
| 2,376,266 | Moore | May 15, 1945 |
| 2,677,901 | Tilleman | May 11, 1954 |

FOREIGN PATENTS

| | | |
|---|---|---|
| 689,548 | Great Britain | Apr. 1, 1953 |